UNITED STATES PATENT OFFICE.

JOHN L. KLEIN, OF NEW YORK, N. Y.

IMPROVEMENT IN THE MANUFACTURE OF SOAP.

Specification forming part of Letters Patent No. 75,170, dated March 3, 1868.

*To all whom it may concern:*

Be it known that I, JOHN L. KLEIN, of the city, county, and State of New York, have invented a new and improved Mode of Making Soap from paraffine and ceria-japonica combined; and I do hereby declare that the following is a full and exact description thereof.

To enable others skilled in the art to make and use my invention, I will proceed to describe its operation.

I take one thousand pounds (1,000 lbs.) of raw paraffine, and five hundred pounds (500 lbs.) ceria-japonica, (vegetable wax,) put it into a kettle heated by steam or fire, and let it melt. When so, I add five hundred pounds (500 lbs.) of salt-lye of 20° Baumé. Let all boil for about one hour. Then I add one thousand five hundred pounds (1,500 lbs.) caustic-soda lye, of 20° Baumé. Let it again boil for two hours. Then I turn off the steam, draw off the lye, and add one thousand pounds (1,000 lbs.) fish-oil and fifty pounds (50 lbs.) palm-oil; also five hundred pounds (500 lbs.) salt-lye, 20° Baumé. Let it boil for one hour. Then I add one thousand pounds (1,000 lbs.) caustic-soda lye. Let it boil four or five hours; then let it settle. When this is all done, I take with a dipper about one thousand pounds (1,000 lbs.) of the compound out of the kettle; put it into a tub; add under constant stirring one hundred pounds (100 lbs.) of salt soda, of a strength of thirty-six degrees (36°) Baumé, and eighty-five degrees (85°) of heat, Fahrenheit. Stir it so long until it is all well combined. When so, I put this compound into a frame. Let it cool and harden, and the soap is finished.

What I claim as my invention, and desire to secure by Letters Patent, is—

The combination of paraffine and ceria japonica to make soap, using for that purpose the aforesaid compound and ingredients, or any other substantially the same, and which will produce the intended effect.

JOHN L. KLEIN.

Witnesses:
 W. HAVARD,
 COR. R. DISOSWAY.